(12) United States Patent
Zhang

(10) Patent No.: US 12,457,403 B2
(45) Date of Patent: Oct. 28, 2025

(54) CONNECTION ESTABLISHMENT METHOD AND ELECTRONIC DEVICE

(71) Applicant: HUAWEI TECHNOLOGIES CO., LTD., Shenzhen (CN)

(72) Inventor: Xingong Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 18/264,735

(22) PCT Filed: Dec. 20, 2021

(86) PCT No.: PCT/CN2021/139682
§ 371 (c)(1),
(2) Date: Aug. 8, 2023

(87) PCT Pub. No.: WO2022/170856
PCT Pub. Date: Aug. 18, 2022

(65) Prior Publication Data
US 2024/0098354 A1 Mar. 21, 2024

(30) Foreign Application Priority Data
Feb. 9, 2021 (CN) .......................... 202110182055.9

(51) Int. Cl.
*H04N 23/57* (2023.01)
*H04N 23/65* (2023.01)

(52) U.S. Cl.
CPC ............. *H04N 23/57* (2023.01); *H04N 23/65* (2023.01)

(58) Field of Classification Search
CPC ...... H04N 23/57; H04N 23/65; H04N 21/442; H04N 23/60; H04N 23/66; H04N 23/661; H04N 21/44218
See application file for complete search history.

(56) References Cited

U.S. PATENT DOCUMENTS

| 8,271,662 | B1* | 9/2012 | Gossweiler, III | H04W 4/80 709/227 |
| 10,425,575 | B2* | 9/2019 | Kasa | H04N 23/667 |
| 2006/0233545 | A1* | 10/2006 | Senba | H04N 23/66 396/529 |
| 2007/0147815 | A1* | 6/2007 | Tanaka | H04N 1/00347 396/541 |
| 2010/0128132 | A1* | 5/2010 | Fukushima | H04N 1/00347 348/207.2 |

(Continued)

FOREIGN PATENT DOCUMENTS

CN 103997595 A 8/2014
CN 111526289 A 8/2020

*Primary Examiner* — Timothy J Henn
(74) *Attorney, Agent, or Firm* — Leydig, Voit & Mayer, Ltd.

(57) ABSTRACT

The method includes: A first electronic device sends a probe frame to an external camera; in a process in which the external camera approaches the first electronic device, a communication module in the external camera is powered on; the external camera obtains the probe frame; in response to the probe frame, the external camera starts a camera module in the external camera; and the external camera sends a response frame to the first electronic device, where the response frame is a reply to the probe frame. In the process in which the external camera approaches the first electronic device, the camera module in the external camera is started.

17 Claims, 7 Drawing Sheets

(56) References Cited

U.S. PATENT DOCUMENTS

| | | | |
|---|---|---|---|
| 2013/0107062 A1* | 5/2013 | Okazaki | H04N 23/66 |
| | | | 348/207.1 |
| 2013/0141640 A1* | 6/2013 | Kim | G03B 29/00 |
| | | | 348/375 |
| 2015/0312467 A1* | 10/2015 | Lee | H04W 68/00 |
| | | | 348/211.2 |
| 2017/0273131 A1* | 9/2017 | Nagahiro | H04N 23/63 |
| 2018/0103192 A1* | 4/2018 | Iwasaki | G06F 3/005 |
| 2019/0149690 A1* | 5/2019 | Ohshima | H04N 1/32765 |
| | | | 348/207.1 |
| 2020/0244868 A1* | 7/2020 | Eshita | H04B 5/20 |
| 2023/0232097 A1* | 7/2023 | Umejima | H04N 23/661 |
| | | | 348/211.2 |

* cited by examiner

CONNECTION ESTABLISHMENT METHOD AND ELECTRONIC DEVICE

CROSS-REFERENCE TO RELATED APPLICATIONS

This application is a national stage of International Application No. PCT/CN2021/139682, filed on Dec. 20, 2021, which claims priority to Chinese Patent Application No. 202110182055.9 filed on Feb. 9, 2021. Both of the aforementioned applications are hereby incorporated by reference in their entireties.

TECHNICAL FIELD

This application relates to the terminal field, and more specifically, relates to a connection establishment method and an electronic device in the terminal field.

BACKGROUND

Currently, for some electronic devices configured with no cameras, for example, a large-screen display device, when a user needs to use a camera function of such an electronic device, an electronic device that can provide a camera function needs to be fastened to the electronic device configured with no camera.

To protect privacy, when the camera function does not need to be used, the user usually takes off the electronic device that can provide the camera function from the electronic device configured with no camera. When the camera function needs to be used again, the user fastens the electronic device to the electronic device configured with no camera, and the electronic device configured with no camera starts to supply power to the electronic device. The electronic device can start only after the power is supplied. During starting of the electronic device, the user cannot use the camera function on the electronic device configured with no camera.

Generally, for the electronic device configured with no camera, when a camera is used, it usually takes several seconds to start the camera. This increases a waiting time for the user to use the camera function, consequently affecting user experience.

SUMMARY

Embodiments of this application provide a connection establishment method and an electronic device, to shorten a waiting time for a user to use a camera function on an electronic device that does not have a camera function.

According to a first aspect, a connection establishment method is provided, including: in a process in which an external camera approaches a first electronic device, a communication module in the external camera is powered on, and the external camera is not connected to the first electronic device. The external camera obtains a probe frame, and the probe frame is sent by the first electronic device. In response to the probe frame, the external camera starts a camera module in the external camera. The external camera sends a response frame to the first electronic device, where the response frame is a reply to the probe frame.

Based on the foregoing technical solution, in the process in which the external camera approaches the first electronic device, the camera module in the external camera is started. Compared with a case in which the camera module in the external camera is started after the external camera is inserted into the first electronic device, the connection establishment method provided in this application can shorten a waiting time for a user to use a camera function on an electronic device that does not have a camera function.

With reference to the first aspect, in some embodiments of the first aspect, the method further includes: the external camera is inserted into an interface of the first electronic device, to enable the external camera to establish an electrical connection to the first electronic device.

With reference to the first aspect and the foregoing embodiment, in some embodiments of the first aspect, the method further includes: the external camera establishes the electrical connection to the first electronic device. The external camera receives a second message, where the second message carries a photographing parameter. The external camera sends a data stream to the first electronic device based on the second message, where a parameter of the data stream is the photographing parameter.

With reference to the first aspect, in some embodiments of the first aspect, before the external camera receives the second message, the method further includes: the external camera obtains a heartbeat message sent by the first electronic device. The external camera sends a response message to the first electronic device, where the response message indicates that the electrical connection between the external camera and the first electronic device is successfully established.

Based on the foregoing technical solution, before the first electronic device sends the second message, the first electronic device first sends the heartbeat message. After the external camera receives the heartbeat message, the external camera may determine that the external camera has successfully established the connection to the first electronic device. Then, the external camera sends the response message to the first electronic device, and the first electronic device may determine, based on the response message, that the first electronic device has successfully established the electrical connection to the external camera.

With reference to the first aspect and the foregoing embodiment, in some embodiments of the first aspect, that the camera module in the external camera is started includes: The communication module in the external camera conducts a circuit between a power supply module in the external camera and the camera module in the external camera by using a start signal. The camera module in the external camera is started.

Based on the foregoing technical solution, in the process in which the external camera approaches the first electronic device, the communication module in the external camera conducts the circuit between the power supply module in the external camera and the camera module in the external camera by using the start signal, and the camera module in the external camera is started after being powered on, so that in the process in which the external camera approaches the first electronic device, the camera module in the external camera is started.

According to a second aspect, a connection establishment method is provided, where the method is applied to a system including a first electronic device and an external camera, and includes: The first electronic device sends a probe frame to the external camera. In a process in which the external camera approaches the first electronic device, a communication module in the external camera is powered on. The external camera obtains the probe frame. In the process in which the external camera approaches the first electronic device, a camera module in the external camera is started.

The external camera sends a response frame to the first electronic device, where the response frame is a reply to the probe frame.

Based on the foregoing technical solution, in the process in which the external camera approaches the first electronic device, the camera module in the external camera is started. Compared with a case in which the camera module in the external camera is started after the external camera is inserted into the first electronic device, the connection establishment method provided in this application can shorten a waiting time for a user to use a camera function on an electronic device that does not have a camera function.

With reference to the second aspect, in some embodiments of the second aspect, the method further includes: the external camera is inserted into an interface of the first electronic device, to enable the external camera to establish an electrical connection to the first electronic device.

With reference to the second aspect and the foregoing embodiment, in some embodiments of the second aspect, that the first electronic device sends a probe frame includes: the first electronic device detects a first operation. The first electronic device detects, in response to the first operation, whether a camera is currently configured for the first electronic device. The first electronic device sends the probe frame to the external camera if it is detected that no camera is currently configured for the first electronic device.

Based on the foregoing technical solution, after detecting the first operation, the first electronic device may determine, based on the first operation, that no camera is currently configured for the first electronic device. In this case, the first electronic device sends the probe frame, and detects a camera around the first electronic device by using the probe frame.

With reference to the second aspect and the foregoing embodiment, in some embodiments of the second aspect, the method further includes: the external camera establishes the electrical connection to the first electronic device. The first electronic device sends a second message to the external camera, where the second message carries a photographing parameter. The external camera sends a data stream to the first electronic device based on the second message, where a parameter of the data stream is the photographing parameter.

With reference to the second aspect and the foregoing embodiment, in some embodiments of the second aspect, before the first electronic device sends the second message to the external camera, the method further includes: the first electronic device sends a heartbeat message to the external camera. The external camera sends a response message to the first electronic device, where the response message indicates that the electrical connection between the external camera and the first electronic device is successfully established.

Based on the foregoing technical solution, before the first electronic device sends the second message, the first electronic device first sends the heartbeat message. After the external camera receives the heartbeat message, the external camera may determine that the external camera has successfully established the connection to the first electronic device. Then, the external camera sends the response message to the first electronic device, and the first electronic device may determine, based on the response message, that the first electronic device has successfully established the connection to the external camera.

With reference to the second aspect and the foregoing embodiment, in some embodiments of the second aspect, that a camera module in the external camera is started includes: the communication module in the external camera conducts a circuit between a power supply module in the external camera and the camera module in the external camera by using a start signal. The camera module in the external camera is started.

Based on the foregoing technical solution, in the process in which the external camera approaches the first electronic device, the communication module in the external camera conducts the circuit between the power supply module in the external camera and the camera module in the external camera by using the start signal, and the camera module in the external camera is started after being powered on, so that in the process in which the external camera approaches the first electronic device, the camera module in the external camera is started.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function.

According to a fourth aspect, this application provides an electronic device, including a touchscreen. The touchscreen includes a touch-sensitive surface, a display, a camera, one or more processors, a memory, a plurality of applications, and one or more computer programs. The one or more computer programs are stored in the memory. The one or more computer programs include instructions. When the instructions are executed by the electronic device, the electronic device is enabled to perform the connection establishment method according to any possible implementation of any one of the foregoing aspects.

According to a fifth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the connection establishment method according to any possible embodiments of any one of the foregoing aspects.

According to a sixth aspect, this application provides a computer-readable storage medium, including computer instructions. When the computer instructions are run on an electronic device, the electronic device is enabled to perform the connection establishment method according to any possible embodiments of any one of the foregoing aspects.

According to a seventh aspect, this application provides a computer program product. When the computer program product runs on an electronic device, the electronic device is enabled to perform the connection establishment method according to any possible embodiments of any one of the foregoing aspects.

DESCRIPTION OF EMBODIMENTS

The following describes the technical solutions in embodiments of this application with reference to the accompanying drawings in embodiments of this application.

Generally, when a user needs to use a camera function on a first electronic device configured with no camera, a second electronic device that can provide a camera function for the user needs to be fastened to the first electronic device. For example, the user may fasten the second electronic device to the first electronic device by using a pogo pin (Pogo Pin).

The first electronic device in embodiments of this application may be an electronic device that can implement a display function, like a large-screen display device, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the first electronic device is not limited in embodiments of this application.

Figure 1:
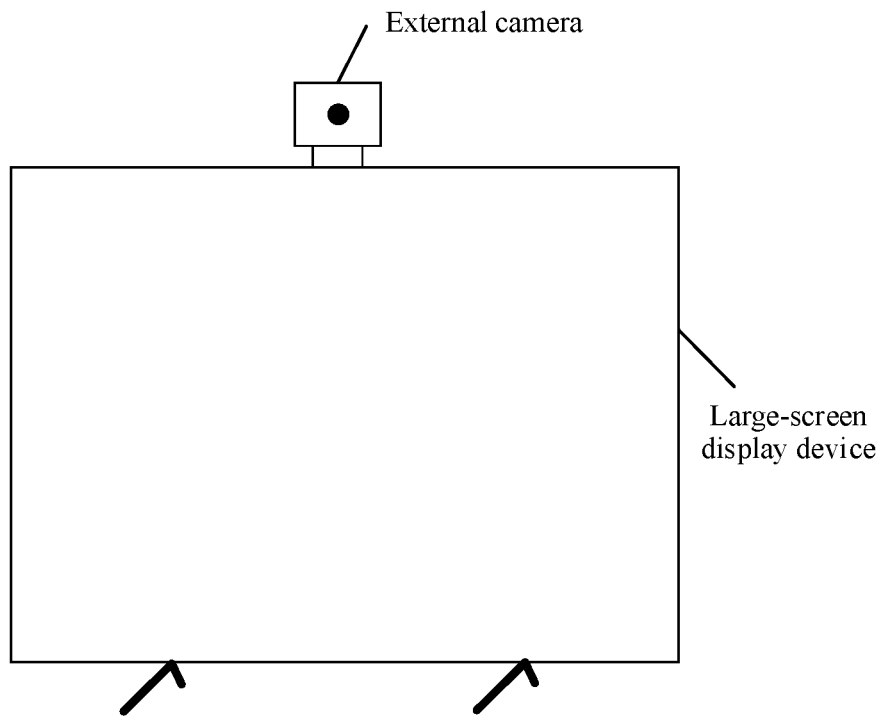
FIG. 1 is a schematic diagram of an external connection status between a second electronic device and a first electronic device according to an embodiment of this application.

For example, FIG. 1 is a schematic diagram of an external connection status between the second electronic device and the first electronic device when the second electronic device is fastened to the first electronic device by using a pogo pin, where the first electronic device is a large-screen display device and the second electronic device is a camera. Because the second electronic device is independent of the first electronic device in embodiments of this application, when the second electronic device is the camera, the second electronic device may be referred to as an external camera. When the external camera does not need to be used, to protect privacy, the user usually takes the external camera off the large-screen display device. In this case, the external camera is separated from the large-screen display device. When the user needs to use a camera function on the large-screen display device again, the user needs to fasten the external camera to the large-screen display device again.

Figure 2:
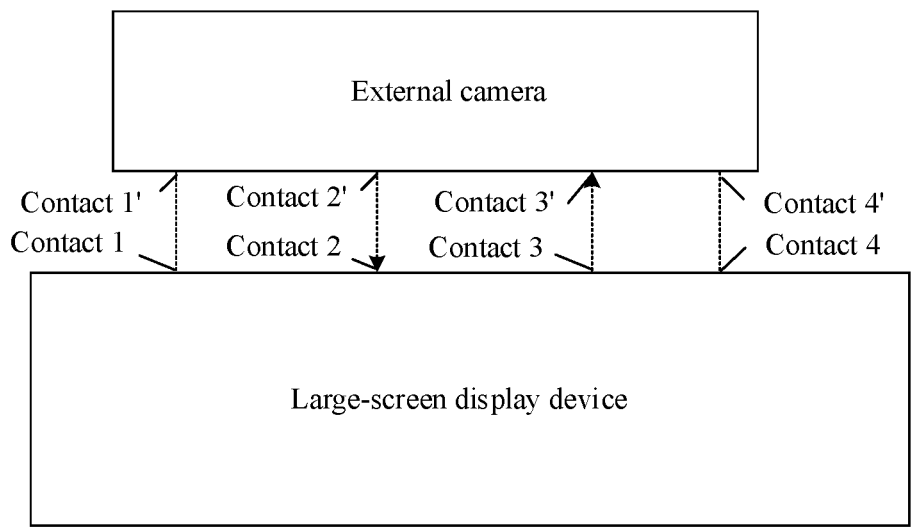
FIG. 2 is a schematic diagram of an internal connection relationship between a second electronic device and a first electronic device according to an embodiment of this application.

FIG. 2 is a schematic diagram of an internal connection relationship between the external camera and the large-screen display device when the user fastens the external camera to the large-screen display device by using the pogo pin. It can be seen that there are four pairs of contacts between the external camera and the large-screen display device, and four contacts distributed on the large-screen display device are respectively denoted as a contact 1, a contact 2, a contact 3, and a contact 4. Four contacts distributed on the external camera are respectively denoted as a contact 1', a contact 2', a contact 3', and a contact 4'.

When the external camera is fastened to the large-screen display device by using the pogo pin, the four pairs of contacts contact each other. In this case, a universal serial bus (USB) connection is completed between the external camera and the large-screen display device. The large-screen display device may supply power to the external camera that does not have an independent power supply capability through a USB interface. The external camera is started after being supplied power. After starting of the external camera is completed, information may be transmitted between the large-screen display device and the external camera through the USB interface.

It can be learned from the foregoing description that the external camera can be started only after power is supplied, and starting duration of the external camera usually takes several seconds. In this period, the user cannot use the camera function on the large-screen display device, and the user can use the camera function on the large-screen display device only after starting of the external camera is completed. It can be learned that this solution cannot implement instant use of the external camera on the large-screen display device, consequently affecting user experience.

In view of this, an embodiment of this application provides a connection establishment method, to shorten a waiting time for a user to use a camera function on an electronic device that does not have a camera function, and improve user experience.

Figure 3:
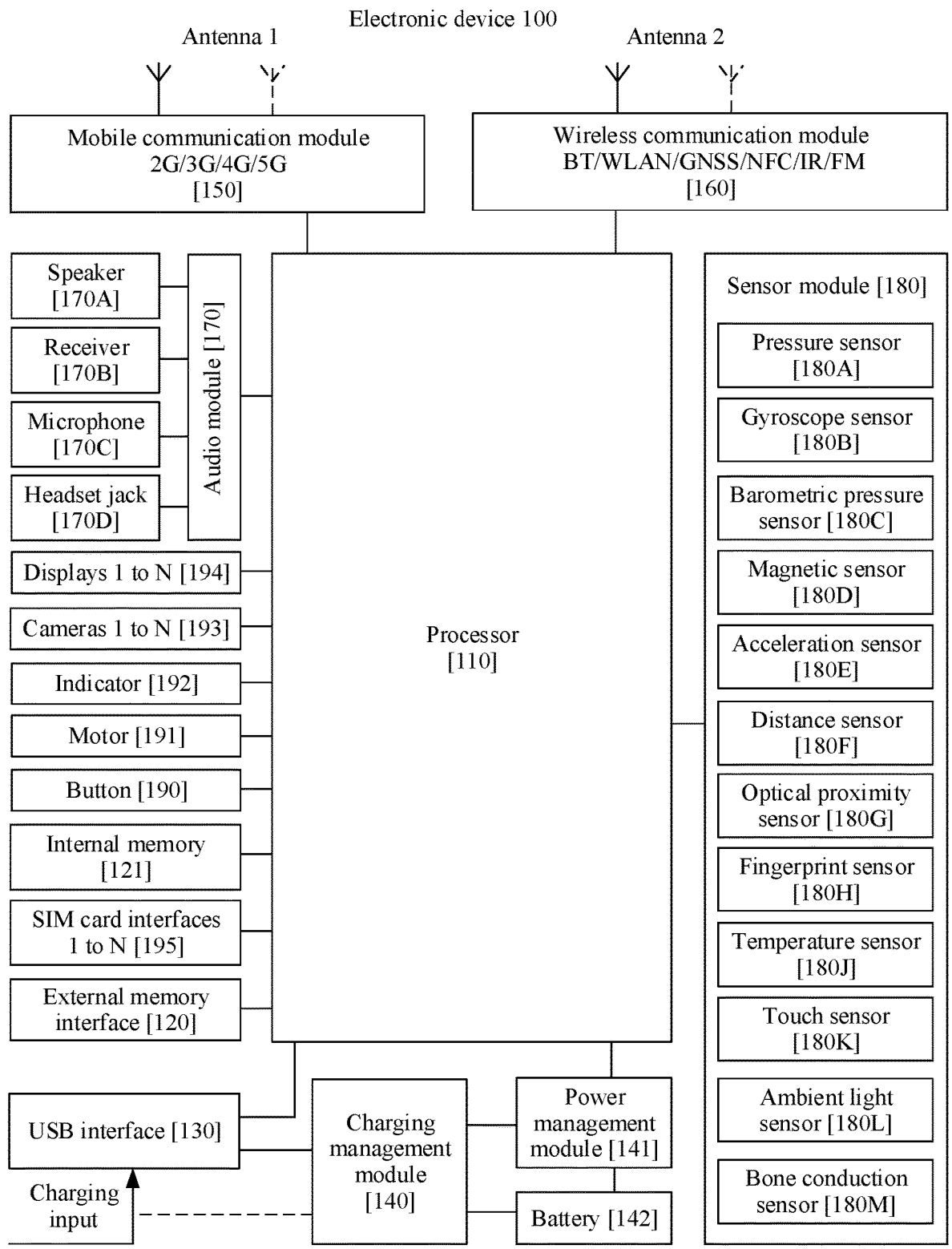
FIG. 3 is a schematic block diagram of an electronic device 100 according to an embodiment of this application.

Before this embodiment of this application is described, an electronic device provided in this embodiment of this application is first described. For example, FIG. 3 is a schematic diagram of a structure of an electronic device according to this embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headsetjack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (neural-NPU), and/or the like. Different processing units may be independent components, or may be integrated into one or more processors.

The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect to the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect to the processor 110 and a peripheral device like the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect to the processor 110 and the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset for playing audio by using headset. Alternatively, the interface may be configured to connect to another electronic device, for example, an AR device.

It may be understood that an interface connection relationship between the modules that is shown in this embodiment of the present invention is merely an example for description, and does not constitute a limitation on the structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some wired charging embodiments, the charging management module 140 may receive a charging input from the wired charger through the USB interface 130. In some wireless charging embodiments, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna of a wireless local area network. In some other embodiments, the antennas may be used in combination with a tuning switch.

The mobile communication module 150 may provide a solution, applied to the electronic device 100, to wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same component as the mobile communication module 150 or another function module.

The wireless communication module 160 may provide a wireless communication solution that is applied to the electronic device 100, and that includes a wireless local area network (WLAN) (for example, a wireless fidelity (, Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication camera module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications ( ), a general packet radio service (, GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format like an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform or the like on frequency energy.

The video codec is configured to compress or decompress a digital video. The electronic device 100 may support one or more video codecs. In this way, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU may implement applications such as intelligent cognition of the electronic device 100, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound play function and an image play function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash storage device, a universal flash storage (UFS), and the like. The processor 110 runs instructions stored in the internal memory 121 and/or instructions stored in the memory disposed in the processor, to perform various function applications and data processing of the electronic device 100.

The electronic device 100 may implement an audio function like music play and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may further be configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile electronic device platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may further be used in a navigation scenario and a motion-sensing game scenario.

The barometric pressure sensor 180C is configured to measure barometric pressure. In some embodiments, the electronic device 100 calculates an altitude through barometric pressure measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a flip device, the electronic device 100 may detect opening and closing of a flip cover by using the magnetic sensor 180D. Further, a feature like automatic unlocking upon opening of the flip cover is set based on a detected opening or closing state of the leather case or a detected opening or closing state of the flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application like switching between landscape mode and portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a leather case mode or a pocket mode for automatically unlocking or screen locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being abnormal shutdown because of a low temperature. In some other embodiments, when the temperature is less than still another threshold, the electronic device 100 boosts an output voltage of the battery 142, to prevent abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in a headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible to different types of SIM cards. The SIM card interface 195 is also compatible to an external storage card. The electronic device 100 interacts with a network through the SIM card, to implement functions such as calls and data communication. In some embodiments, the electronic device 100 uses an eSIM, that is, an embedded SIM card. The eSIM card may be embedded into the electronic device 100, and cannot be separated from the electronic device 100. It should be understood that, in addition to the various components or modules listed in FIG. 3, a structure of the electronic device 100 is not specifically limited in this embodiment of this application. In some other embodiments of this application, the electronic device 100 may further include more or fewer components than those shown in the figure, combine some components, split some components, or have different component arrangements. The components shown in the figure may be implemented by hardware, software, or a combination of software and hardware.

A software system of the electronic device 100 may use a layered architecture, an event-driven architecture, a microkernel architecture, a micro service architecture, or a cloud architecture. In this embodiment of this application, an Android system of a layered architecture is used as an example to describe a software structure of the electronic device 100.

Figure 4:
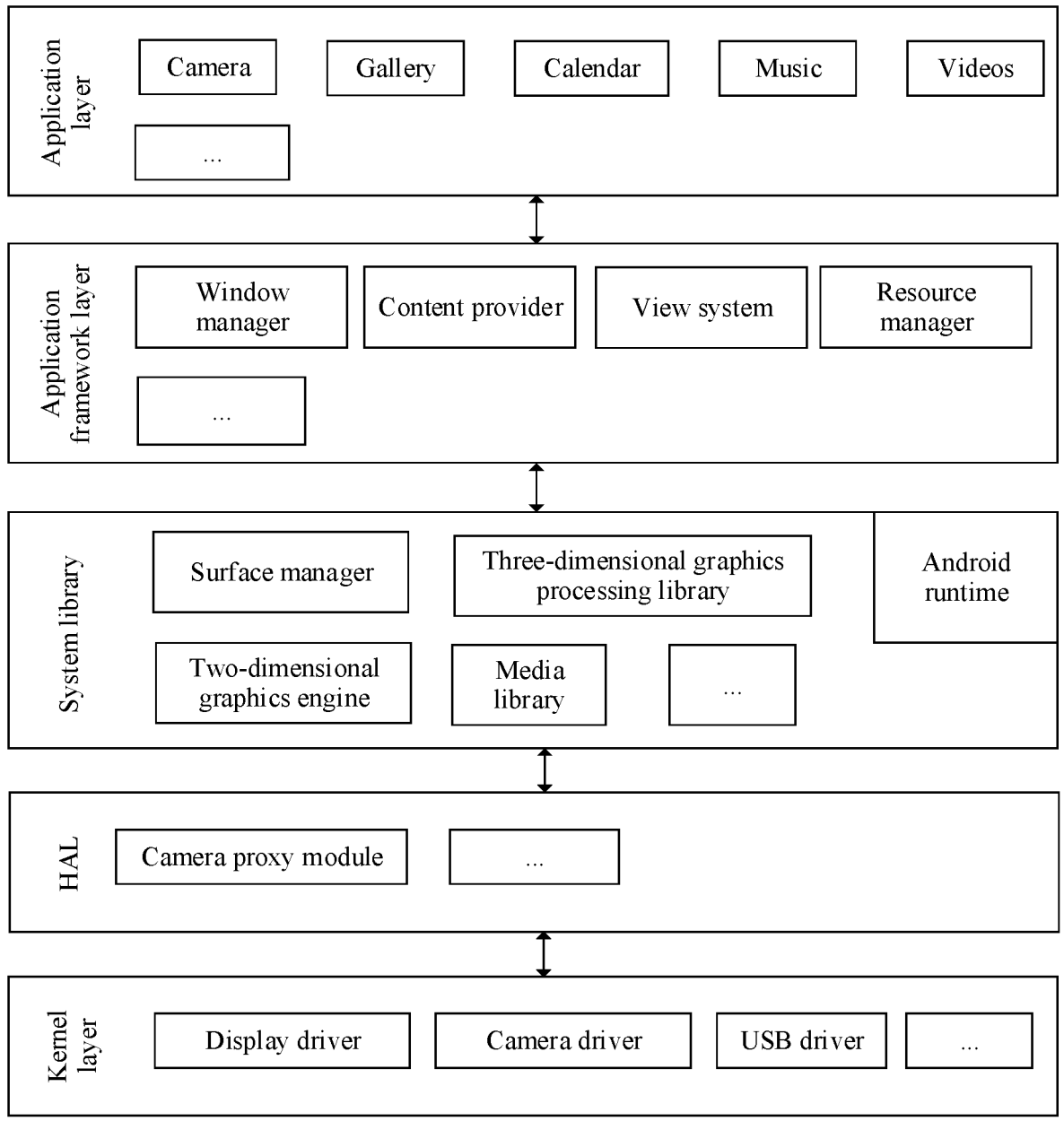
FIG. 4 is a block diagram of a software structure of an electronic device 100 according to an embodiment of this application.

FIG. 4 is a block diagram of the software structure of the electronic device 100 according to this embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, a hardware abstract layer (hardware abstraction layer, HAL), and a kernel layer from top to bottom.

The application layer may include a series of application packages. As shown in FIG. 3, the application packages may include applications (APPs) such as Camera, Gallery, Calendar, Music, and Videos.

The application framework layer provides an application programming interface (API) and a programming framework for an application at the application layer. The application framework layer includes some predefined functions.

As shown in FIG. 4, the application framework layer may include a window manager, a content provider, a view system, a resource manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, and the like.

The view system includes visual controls such as a control for displaying a text and a control for displaying a picture. The view system may be configured to construct an application. A display interface may include one or more views.

The resource manager provides various resources such as a localized character string, an icon, a picture, a layout file, and a video file for an application.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of functional modules, such as a surface manager, a media library, a three-dimensional graphics processing library, and a two-dimensional graphics engine.

The surface manager is configured to manage a display subsystem and provide fusion of two-dimensional and three-dimensional layers for a plurality of applications.

The media library supports playback and recording in a plurality of commonly used audio and video formats, as well as static image files. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for 2D drawing.

The HAL may include a camera proxy module. In this embodiment of this application, for a function of the camera proxy module, refer to specific descriptions in the connection establishment method provided in this embodiment of this application.

The kernel layer is a layer between hardware and software. The kernel layer may include, for example, a display driver.

In this embodiment of this application, the electronic device 100 may be the first electronic device.

Figure 5A:
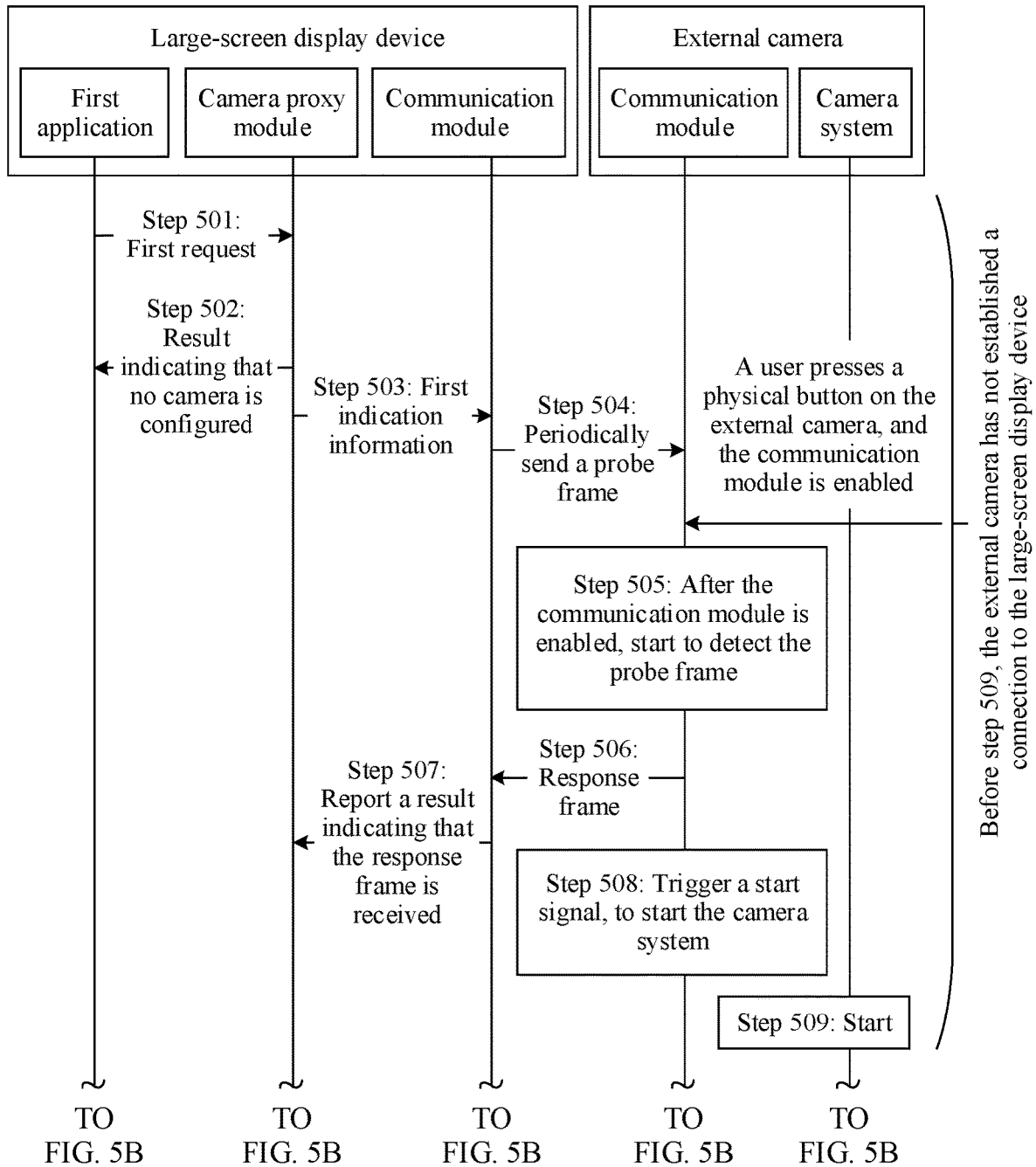
FIG. 5A and FIG. 5B are a schematic diagram of a connection establishment method according to an embodiment of this application.
Figure 5B:
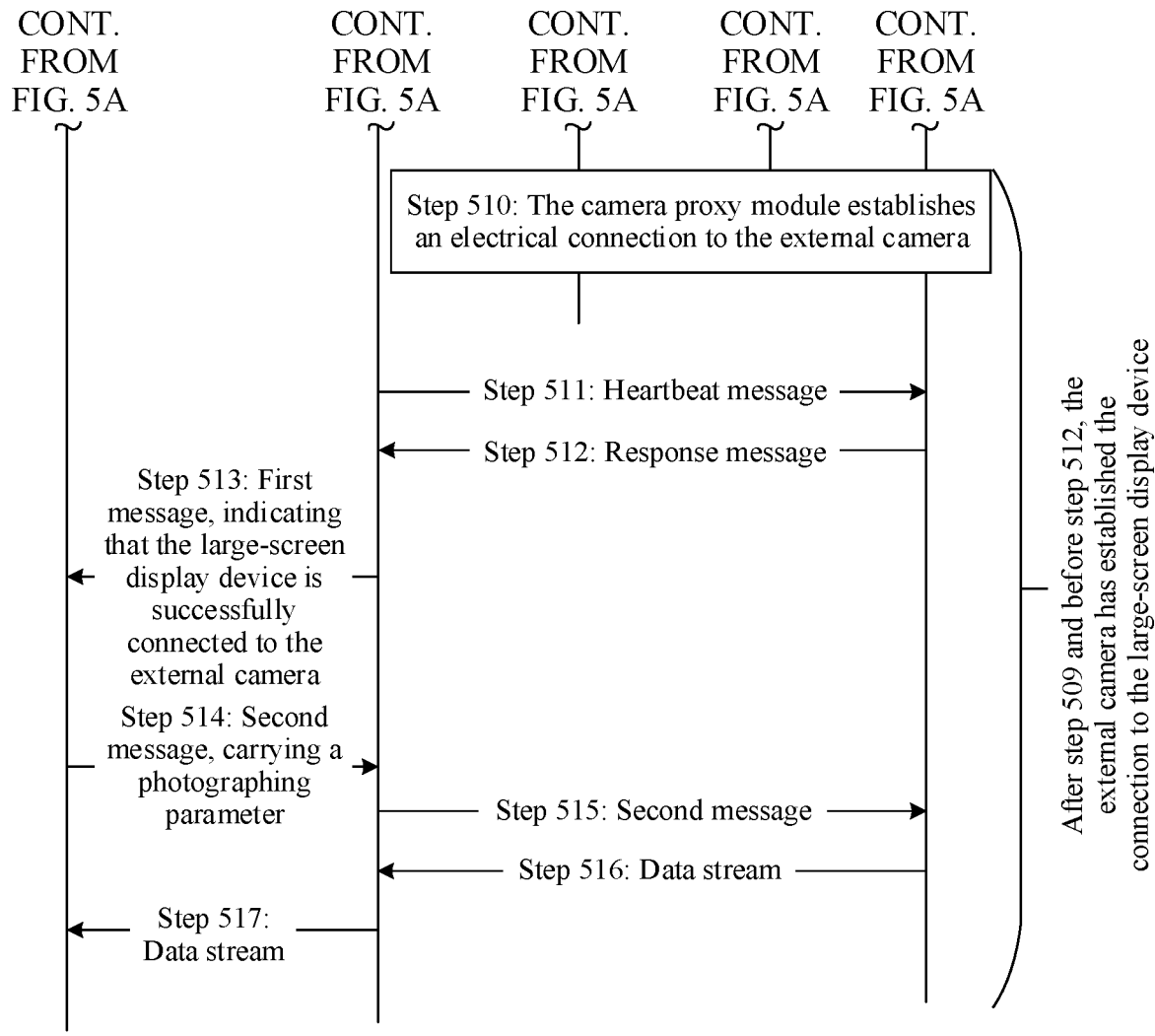

The following describes, with reference to FIG. 5A and FIG. 5B, a method 500 for establishing an electrical connection according to an embodiment of this application by using an example in which a first electronic device is a large-screen display device and a second electronic device is an external camera. FIG. 5A and FIG. 5B are a schematic interaction flowchart of the method 500 for establishing an electrical connection.

Step 501: A first application sends a first request to a camera proxy module of the large-screen display device. The first request requests to use a camera function of the large-screen display device.

For example, a user opens a camera app on the large-screen display device. In this case, the camera app sends, to the camera proxy module in the large-screen display device, the first request for requesting to use the camera function of the large-screen display device. The camera app corresponds to the first application. The operation on the camera app performed by the user may be denoted as a first operation.

Step 502: The camera proxy module reports, to the first application, a result indicating that no camera is configured for the large-screen display device.

For example, after receiving the first request for requesting to use the camera function, the camera proxy module may determine whether the large-screen display device is currently configured with a camera. For example, the camera proxy module may check whether a file handle corresponding to a camera exists in the large-screen display device. It should be noted that the file handle corresponding to the camera is generated in the large-screen display device only when the large-screen display device has a camera. Because the large-screen display device is not configured with a camera at this time, the camera proxy module cannot access the file handle corresponding to the camera in the large-screen display device. In this case, the camera proxy module may consider that no camera is configured for the large-screen display device, and report, to the camera app, the result indicating that no camera is configured for the large-screen display device.

Step 503: The camera proxy module sends first indication information to a communication module in the large-screen display device. The first indication information indicates the communication module in the large-screen display device to send a probe frame in a short-distance mode.

For example, when learning that no camera is currently configured for the large-screen display device, the camera proxy module may trigger the communication module to search for a surrounding electronic device that can provide a camera function. For example, the camera proxy module may send the first indication information to the communication module. The first indication information indicates the communication module in the large-screen display device to send the probe frame in the short-distance mode, and the probe frame is used to search for another electronic device that can provide a camera function for the large-screen display device.

Step 504: The communication module in the large-screen display device periodically sends the probe frame in the short-distance mode.

For example, the communication module in the large-screen display device periodically sends the probe frame in the short-distance mode. For example, the communication module in the large-screen display device sends a publish frame in the short-distance mode.

The short-distance mode indicates that when the communication module sends a probe frame in the short-distance mode, a device within a relatively small radius can detect the probe frame by using the large-screen display device as a circle center. For example, when the communication module sends the probe frame in the short-distance mode, a device within a radius of 50 centimeters can detect the probe frame by using the large-screen display device as the circle center.

Step 505: After a communication module in the external camera is enabled, start to detect the probe frame.

For example, because no camera is currently configured for the large-screen display device, when the user needs to use the camera function of the large-screen display device, the external camera needs to be fastened to the large-screen display device. For example, after the user opens the camera app on the large-screen display device, the external camera may be fastened to the large-screen display device by using a pogo pin, and in a time period from the user picking up the external camera to fastening the external camera to the large-screen display device by using the pogo pin, there is an approaching process from the external camera to the large-screen display device from far to near.

In the process in which the user moves the external camera close to the large-screen display device, the user may control a power supply module to supply power to the communication module in the external camera, and then the communication module starts to detect the probe frame.

For example, an independent power supply module may be built in the external camera. For example, the independent power supply module may be a lithium battery, and the lithium battery may supply power to the communication module in the external camera. In addition, to control whether the lithium battery supplies power, a physical button may be embedded in the external camera. When the physical button is not pressed, the lithium battery does not supply power to the communication module in the external camera. When the physical button is pressed, the lithium battery starts to supply power to the communication module in the external camera. It should be noted that the communication module in the external camera may have only a working capability of the short-distance mode. In other words, the communication module in the external camera may always work in the short-distance mode after being supplied power.

The user may press the physical button on the external camera in a process of moving the external camera close to the large-screen display device. In this case, the communication module is supplied power, and then the communication module starts to detect the probe frame.

Figure 6:
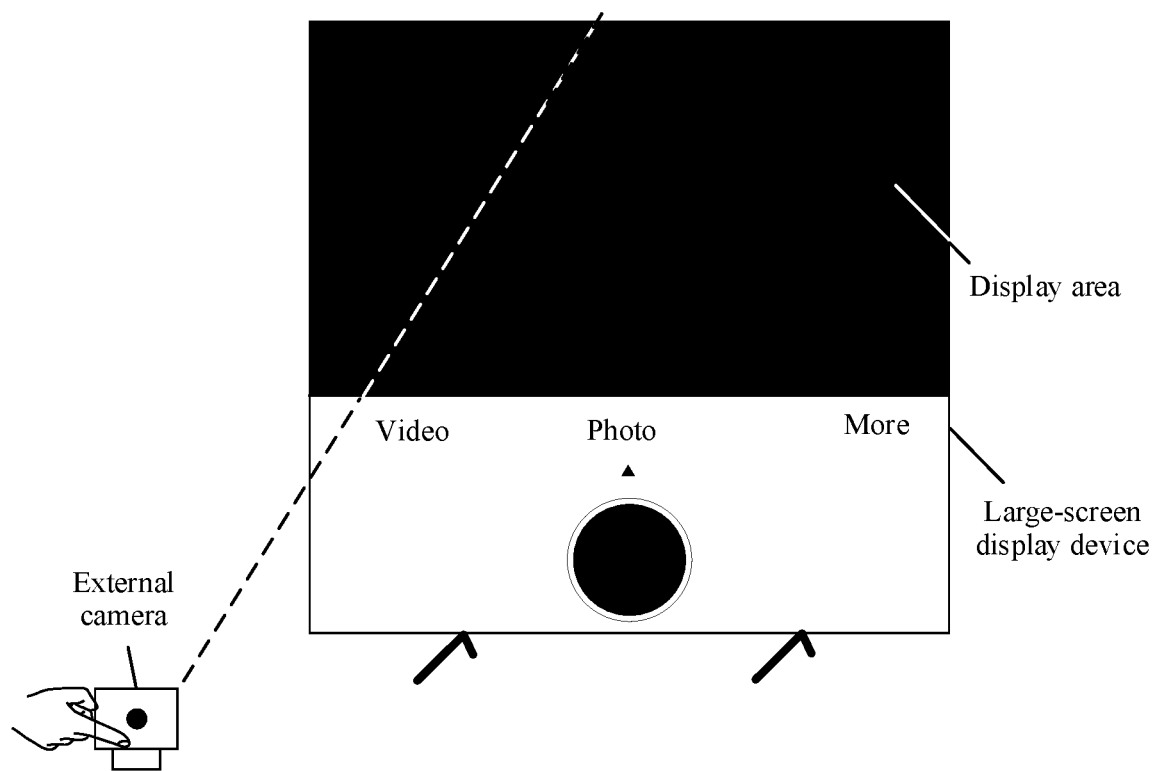
FIG. 6 is a schematic diagram of a state in which a second electronic device is approaching a first electronic device according to an embodiment of this application.

FIG. 6 is a schematic diagram of a state in which the external camera is approaching the large-screen display device. In this case, the large-screen display device does not have a camera function. Therefore, after the user opens the camera app on the large-screen display device, there is no display image in a display area on a display interface of the large-screen display device. In other words, in this case, the display area of the large-screen display device is in a black screen state.

Step 506: After detecting the probe frame, the communication module in the external camera sends a response frame in the short-distance mode.

For example, when the communication module in the external camera detects the probe frame from the large-screen display device, in this case, the communication module in the external camera may send the response frame in the short-distance mode.

For example, in the process in which the external camera approaches the large-screen display device, the communication module in the external camera detects the probe frame at a location 30 centimeters away from the large-screen display device. In this case, the communication module in the external camera sends the response frame in the short-distance mode.

Step 507: The communication module in the large-screen display device reports, to the camera proxy module, a result indicating that the response frame has been received.

For example, after detecting the response frame, the communication module in the large-screen display device may report, to the camera proxy module, that the response frame has been received. In this case, the camera proxy module may consider that the external camera is approaching the large-screen display device. In some embodiments, when the probe frame is a publish frame, a corresponding response frame is an identify frame.

In addition, when the camera proxy module in the large-screen display device learns that the communication module in the large-screen display device has received the response frame, it may be determined that the external camera has received the probe frame. In this case, the camera proxy module may indicate the communication module in the large-screen display device to stop sending the probe frame.

It should be noted that the foregoing merely uses 30 centimeters as an example for description, and does not constitute a limitation on this embodiment of this application. During specific implementation, a distance at which the communication module can detect the probe frame falls within the protection scope of this application.

Step 508: The communication module in the external camera triggers a start signal, to start a camera module in the external camera.

For example, after sending the response frame, the communication module in the external camera may trigger starting of the camera module in the external camera by using the start signal.

Figure 7:
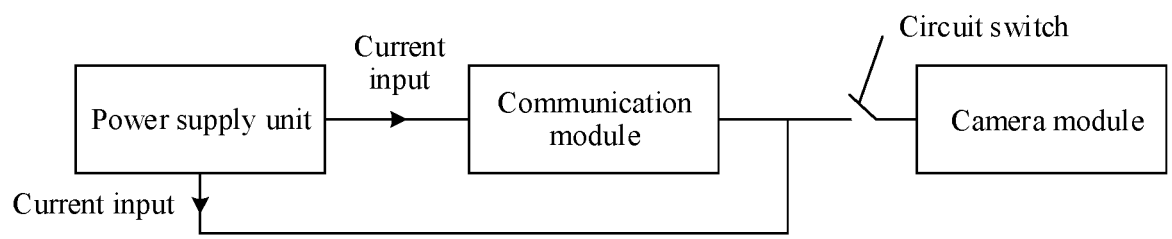
FIG. 7 is a schematic diagram of an example of a connection relationship among a power supply module, a communication module, and a camera module according to an embodiment of this application.

FIG. 7 is a schematic diagram of an example of a connection relationship among the power supply module, the communication module, and the camera module when the power supply module in the external camera supplies power to the external camera. After sending the response frame, the communication module may trigger, by using the start signal, a circuit switch between the power supply module and the camera module to be closed. In this case, the camera module is powered on and started. In an embodiment, the start signal may be implemented by an event.

Step 509: The camera module in the external camera is started.

Step 510: The camera proxy module in the large-screen display device establishes an electrical connection to the external camera.

When the external camera is fastened to the large-screen display device by using the pogo pin, the large-screen display device runs a USB driver. After the USB driver runs, a USB connection is established between the external camera and the large-screen display device. If the USB connection has been established between the external camera and the large-screen display device, and starting of the camera module in the external camera is completed, the electrical connection is successfully established between the large-screen display device and the external camera.

Step 511: The camera proxy module sends a heartbeat message to the camera module in the external camera.

For example, after learning that the communication module in the large-screen display device has received the response frame, the camera proxy module may determine whether the external camera is successfully connected to the large-screen display device.

For example, the camera proxy module may detect, at a preset cycle, whether the external camera is successfully connected to the large-screen display device. For example, the camera proxy module may send the heartbeat message to the camera module in the external camera at a period of 30 milliseconds. The heartbeat message is used to determine whether the external camera is successfully connected to the large-screen display device. If the camera module in the external camera receives the heartbeat message, it indicates that the external camera is successfully connected to the large-screen display device. It should be noted that, after the large-screen display device is powered on, the camera proxy module may always send the heartbeat message at the preset cycle.

Figure 8:
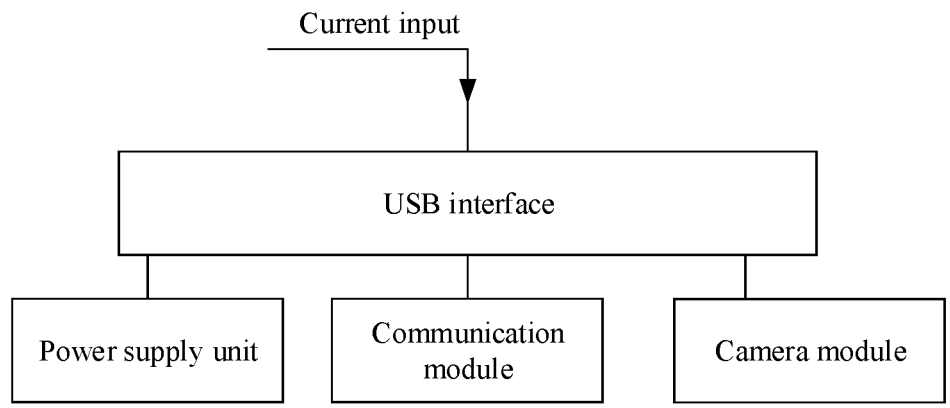
FIG. 8 is a schematic diagram of an example of a connection relationship among a USB interface, a power supply module, a communication module, and a camera module according to an embodiment of this application.

It should be noted that after the USB connection is established between the external camera and the large-screen display device, the large-screen display device may supply power to the external camera through a USB interface, and in addition, may charge the power supply module through the USB interface while supplying power to the external camera. FIG. 8 is a schematic diagram of an example of a connection relationship among the USB interface, the power supply module, the communication module, and the camera module when the USB interface charges the power supply module and supplies power to the external camera. It should be noted that when the power supply module is in a charging state, the power supply module may stop supplying power to the external camera.

Step 512: The camera module in the external camera returns a response message to the camera proxy module.

For example, if the camera module in the external camera receives the heartbeat message, the external camera may consider that the external camera is successfully connected to the large-screen display device. In this case, the camera module in the external camera may send the response message to the camera proxy module. The response message is used to notify the camera proxy module that the external camera is successfully connected to the large-screen display device.

In addition, the camera proxy module may further consider that the external camera is successfully connected to the large-screen display device after a preset time period, for example, 10 milliseconds, after receiving the response frame from the external camera.

After learning that the external camera is successfully connected to the large-screen display device, the camera proxy module may wait to receive a data stream output by the large-screen display device.

It should be noted that the cycle in which the camera proxy module detects whether starting of the external camera is completed is merely an example, and does not constitute a limitation on this embodiment of this application.

Step 513: The camera proxy module sends a first message to the first application, to notify the first application that the external camera is successfully connected to the large-screen display device.

For example, if the camera proxy module determines that the external camera is successfully connected to the large-screen display device, the camera proxy module may send the first message to the camera app, to notify the camera app that the large-screen display device is successfully connected to the external camera.

Step 514: The first application sends a second message to the camera proxy module, where the second message carries a photographing parameter.

For example, after learning that the large-screen display device is successfully connected to the external camera, the camera app may send the second message to the camera proxy module. The second message may carry the photographing parameter, and the photographing parameter may include an encoding manner, a bit rate, resolution, and a frame rate that should be used when the external camera encodes an original frame image.

Step 515: The camera proxy module sends the second message to the camera module in the external camera.

For example, after receiving the second message from the camera app, the camera proxy module sends the second message to the camera module in the external camera.

Step 516: The camera module in the external camera outputs the data stream to the camera proxy module.

For example, after receiving the second message from the camera proxy module, and learning that the external camera is successfully connected to the large-screen display device, the camera module in the external camera may encode the original frame image based on the photographing parameter carried in the second message, generate the data stream, and output the data stream to the camera proxy module. In other words, a parameter of the data stream is the photographing parameter carried in the second message.

Step 517: The camera proxy module outputs the data stream to the first application.

For example, after receiving the data stream from the camera module in the external camera, the camera proxy module outputs the data stream to the first application, and then the first application displays, on the large-screen display device, a display image corresponding to the data stream.

Figure 9:
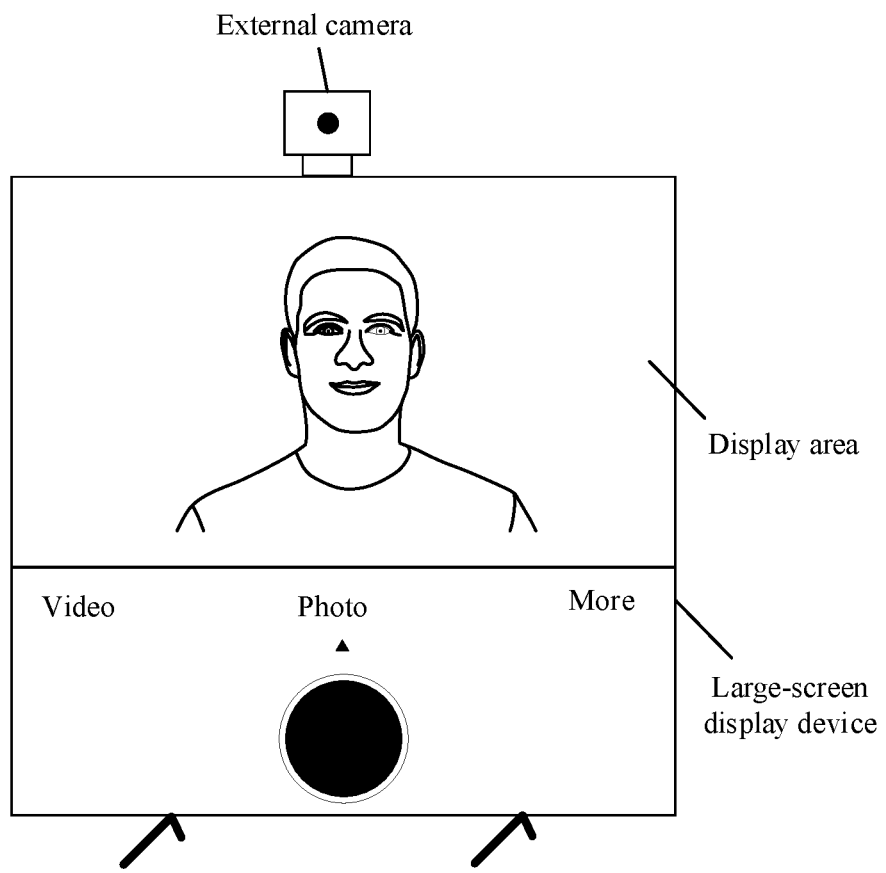
FIG. 9 is a schematic diagram of a display interface of a first electronic device after a second electronic device is successfully connected to the first electronic device according to an embodiment of this application.

FIG. 9 shows a display interface of the large-screen display device after the large-screen display device is successfully connected to the external camera. In this case, content displayed in the display area of the large-screen display device is obtained by the external camera.

During an example implementation, the communication module in this embodiment of this application may be a Bluetooth module or a wireless-fidelity (wireless-fidelity, Wi-Fi) module.

It should be understood that the display interfaces of the large-screen display device shown in FIG. 6 and FIG. 9 in this application are merely used as examples, and do not constitute a limitation on this application. During specific implementation, a display interface of an actual product is used.

It should be understood that the foregoing descriptions are merely intended to help a person skilled in the art better understand embodiments of this application, but are not intended to limit the scope of embodiments of this application. It is clear that a person skilled in the art may make various equivalent modifications or changes based on the foregoing examples. For example, some steps in the foregoing method 500 may be unnecessary, or some steps may be newly added. Alternatively, any two or more of the foregoing embodiments are combined. A modified, changed, or combined solution also falls within the scope of embodiments of this application.

It should be further understood that sequence numbers of the foregoing processes do not mean execution orders. The execution orders of the processes should be determined based on functions and internal logic of the processes, and should not be construed as any limitation on the implementation processes of embodiments of this application.

In embodiments, the electronic device may be divided into functional modules based on the foregoing method examples. For example, each functional module corresponding to each function may be obtained through division, or two or more functions may be integrated into one camera module. The integrated module may be implemented in a form of hardware. It should be noted that, in embodiments, division into the modules is an example, is merely logical function division, and may be other division during actual implementation.

It should be noted that all related content of the steps in the foregoing method embodiments may be cited in function description of corresponding functional modules. Details are not described herein again.

The electronic device provided in embodiments is configured to perform the connection establishment method. Therefore, an effect same as that of the foregoing implementation methods can be achieved. When an integrated unit is used, the electronic device may include a camera module, a storage module, and a communication module. The camera module may be configured to control and manage actions of the electronic device, for example, may be configured to support the electronic device in performing the steps performed by a processing unit. The storage module may be configured to support the electronic device in storing program code, data, and the like. The communication module may be configured to support communication between the electronic device and another device.

The camera module may be a processor or a controller. The processor or the controller may implement or execute various example logical blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may specifically be a device, for example, a radio frequency circuit, a Bluetooth chip, or a Wi-Fi chip, that interacts with another electronic device.

In an embodiment, when the camera module is the processor and the storage module is the memory, the electronic device in this embodiment may be a device having the structure shown in FIG. 2.

An embodiment further provides a computer-readable storage medium. The computer-readable storage medium stores computer instructions. When the computer instructions are run on an electronic device, the electronic device is enabled to perform the foregoing related method steps, to implement the connection establishment method in the foregoing embodiments.

An embodiment further provides a computer program product. When the computer program product runs on a computer, the computer is enabled to perform the foregoing related steps, to implement the connection establishment method in the foregoing embodiments.

In addition, an embodiment of this application further provides an apparatus. The apparatus may specifically be a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the connection establishment method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on descriptions about the foregoing embodiments, a person skilled in the art may understand that, for a purpose of convenient and brief description, division into the foregoing functional modules is used as an example for illustration. During actual application, the foregoing functions may be allocated to different functional modules and implemented based on a requirement. In other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed in different places. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processorto perform all or some of the steps of the methods described in embodiments of this application. The foregoing storage medium includes any medium that can store program code, like a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A connection establishment method, wherein the method is applied to a system comprising a first electronic device and an external camera, and the external camera is not connected to the first electronic device, and the method comprises:
sending, by the first electronic device, a probe frame to the external camera;
in a process in which the external camera approaches the first electronic device, powering on a communication module in the external camera;
obtaining, by the external camera, the probe frame;
based on the probe frame, starting, by the external camera, a camera module in the external camera; and
sending, by the external camera, a response frame to the first electronic device, wherein the response frame is a reply to the probe frame,
wherein the starting a camera module in the external camera comprises:
connecting, by the communication module in the external camera, a circuit between a power supply module in the external camera and the camera module in the external camera based on a start signal; and
starting the camera module in the external camera.

2. The method according to claim 1, wherein the method further comprises:
inserting the external camera into an interface of the first electronic device, to enable the external camera to establish an electrical connection to the first electronic device.

3. The method according to claim 1, wherein the sending, by the first electronic device, a probe frame to the external camera comprises:
detecting, by the first electronic device, a first operation;
detecting, by the first electronic device based on the first operation, whether a camera is currently configured for the first electronic device; and
sending, by the first electronic device, the probe frame to the external camera if it is detected that no camera is currently configured for the first electronic device.

4. The method according to claim 2, wherein the method further comprises:
establishing, by the external camera, the electrical connection to the first electronic device;
sending, by the first electronic device, a second message to the external camera, wherein the second message carries a photographing parameter; and
sending, by the external camera, a data stream to the first electronic device based on the second message, wherein a parameter of the data stream is the photographing parameter.

5. The method according to claim 4, wherein before the sending, by the first electronic device, a second message to the external camera, the method further comprises:
sending, by the first electronic device, a heartbeat message to the external camera; and
sending, by the external camera, a response message to the first electronic device, wherein the response message indicates that the electrical connection is successfully established between the external camera and the first electronic device.

6. The method according to claim 1, wherein the connecting the circuit between the power supply module in the external camera and the camera module in the external camera comprises:
triggering a circuit switch between the power supply module in the external camera and the camera module in the external camera to be closed.

7. A connection establishment method, wherein the method is performed by an external camera, and the external camera is not connected to a first electronic device, and the method comprises:
in a process in which the external camera approaches the first electronic device, powering on a communication module in the external camera;

obtaining, by the external camera, a probe frame, wherein the probe frame is sent by the first electronic device;

based on the probe frame, starting, by the external camera, a camera module in the external camera; and sending, by the external camera, a response frame to the first electronic device, wherein the response frame is a reply to the probe frame, wherein the starting a camera module in the external camera comprises:

connecting, by the communication module in the external camera, a circuit between a power supply module in the external camera and the camera module in the external camera based on a start signal; and starting the camera module in the external camera.

8. The method according to claim 7, wherein the method further comprises:

inserting the external camera into an interface of the first electronic device, to enable the external camera to establish an electrical connection to the first electronic device.

9. The method according to claim 8, wherein the method further comprises:

establishing, by the external camera, the electrical connection to the first electronic device;

receiving, by the external camera, a second message, wherein the second message carries a photographing parameter; and sending, by the external camera, a pre-data stream to the first electronic device based on the second message, wherein a parameter of the data stream is the photographing parameter.

10. The method according to claim 9, wherein before the external camera receives the second message, the method further comprises:

obtaining, by the external camera, a heartbeat message sent by the first electronic device; and sending, by the external camera, a response message to the first electronic device, wherein the response message indicates that the electrical connection is successfully established between the external camera and the first electronic device.

11. The method according to claim 7, wherein the connecting the circuit between the power supply module in the external camera and the camera module in the external camera comprises:

triggering a circuit switch between the power supply module in the external camera and the camera module in the external camera to be closed.

12. An electronic device, comprising one or more processors, a memory, and one or more programs, wherein the one or more programs are stored in the memory, and when the one or more programs are executed by the processor, the electronic device is enabled to perform the connection establishment method:

sending, by the first electronic device, a probe frame to the external camera;

in a process in which the external camera approaches the first electronic device, powering on a communication module in the external camera;

obtaining, by the external camera, the probe frame;

in response to the probe frame, starting, by the external camera, a camera module in the external camera; and sending, by the external camera, a response frame to the first electronic device, wherein the response frame is a reply to the probe frame, wherein the starting a camera module in the external camera comprises:

connecting, by the communication module in the external camera, a circuit between a power supply module in the external camera and the camera module in the external camera based on a start signal; and starting the camera module in the external camera.

13. The electronic device according to claim 12, wherein the method further comprises:

inserting the external camera into an interface of the first electronic device, to enable the external camera to establish an electrical connection to the first electronic device.

14. The electronic device according to claim 12, wherein the sending, by the first electronic device, a probe frame to the external camera comprises:

detecting, by the first electronic device, a first operation;

detecting, by the first electronic device in response to the first operation, whether a camera is currently configured for the first electronic device; and sending, by the first electronic device, the probe frame to the external camera if it is detected that no camera is currently configured for the first electronic device.

15. The electronic device according to claim 14, wherein the method further comprises:

establishing, by the external camera, an electrical connection to the first electronic device;

sending, by the first electronic device, a second message to the external camera, wherein the second message carries a photographing parameter; and sending, by the external camera, a data stream to the first electronic device based on the second message, wherein a parameter of the data stream is the photographing parameter.

16. The electronic device according to claim 15, wherein before the sending, by the first electronic device, a second message to the external camera, the method further comprises:

sending, by the first electronic device, a heartbeat message to the external camera; and sending, by the external camera, a response message to the first electronic device, wherein the response message indicates that the electrical connection is successfully established between the external camera and the first electronic device.

17. The electronic device according to claim 12, wherein the connecting the circuit between the power supply module in the external camera and the camera module in the external camera comprises:

triggering a circuit switch between the power supply module in the external camera and the camera module in the external camera to be closed.

* * * * *